United States Patent [19]

Bartholomew

[11] Patent Number: 5,110,161
[45] Date of Patent: May 5, 1992

[54] MEANS OF IMPROVING PERFORMANCE OF SWIVELLING PRESSURE SEALING DEVICES

[75] Inventor: Donald D. Bartholomew, Mt. Clemens, Mich.

[73] Assignee: Proprietary Technology, Inc., Southfield, Mich.

[21] Appl. No.: 612,258

[22] Filed: Nov. 13, 1990

[51] Int. Cl.⁵ .............................................. F16L 27/08
[52] U.S. Cl. .................................... 285/281; 285/379
[58] Field of Search ................ 285/281, 98, 379, 108; 277/189

[56] References Cited

U.S. PATENT DOCUMENTS

| Re. 24,786 | 2/1960 | Press | 285/39 X |
|---|---|---|---|
| 398,620 | 2/1889 | Jobes | 285/281 |
| 1,436,392 | 11/1922 | Ganz | 285/281 |
| 1,564,934 | 12/1925 | Buelna et al. | 285/281 X |
| 1,657,987 | 1/1928 | Albertoni | 285/281 |
| 2,560,263 | 7/1951 | Wiegand et al. | 285/281 X |
| 3,840,264 | 10/1974 | Bennett | 285/98 |
| 3,957,205 | 5/1976 | Costa | 285/281 X |
| 4,205,866 | 6/1980 | McCracken | 285/281 |
| 4,456,287 | 6/1984 | Bisonaya | 285/98 X |

FOREIGN PATENT DOCUMENTS

| 0485728 | 8/1952 | Canada | 285/98 |
|---|---|---|---|
| 2417051 | 10/1979 | France | 285/379 |

Primary Examiner—Randolph A. Reese
Assistant Examiner—Heather Chun
Attorney, Agent, or Firm—Harness, Dickey & Pierce

[57] ABSTRACT

A swivellable fitting assembly has a housing with a stem with a rotatable nipple on the stem. The rotatable nipple is sealed and spaced from the nipple to enable rotation of the nipple or housing with respect to one another.

6 Claims, 3 Drawing Sheets

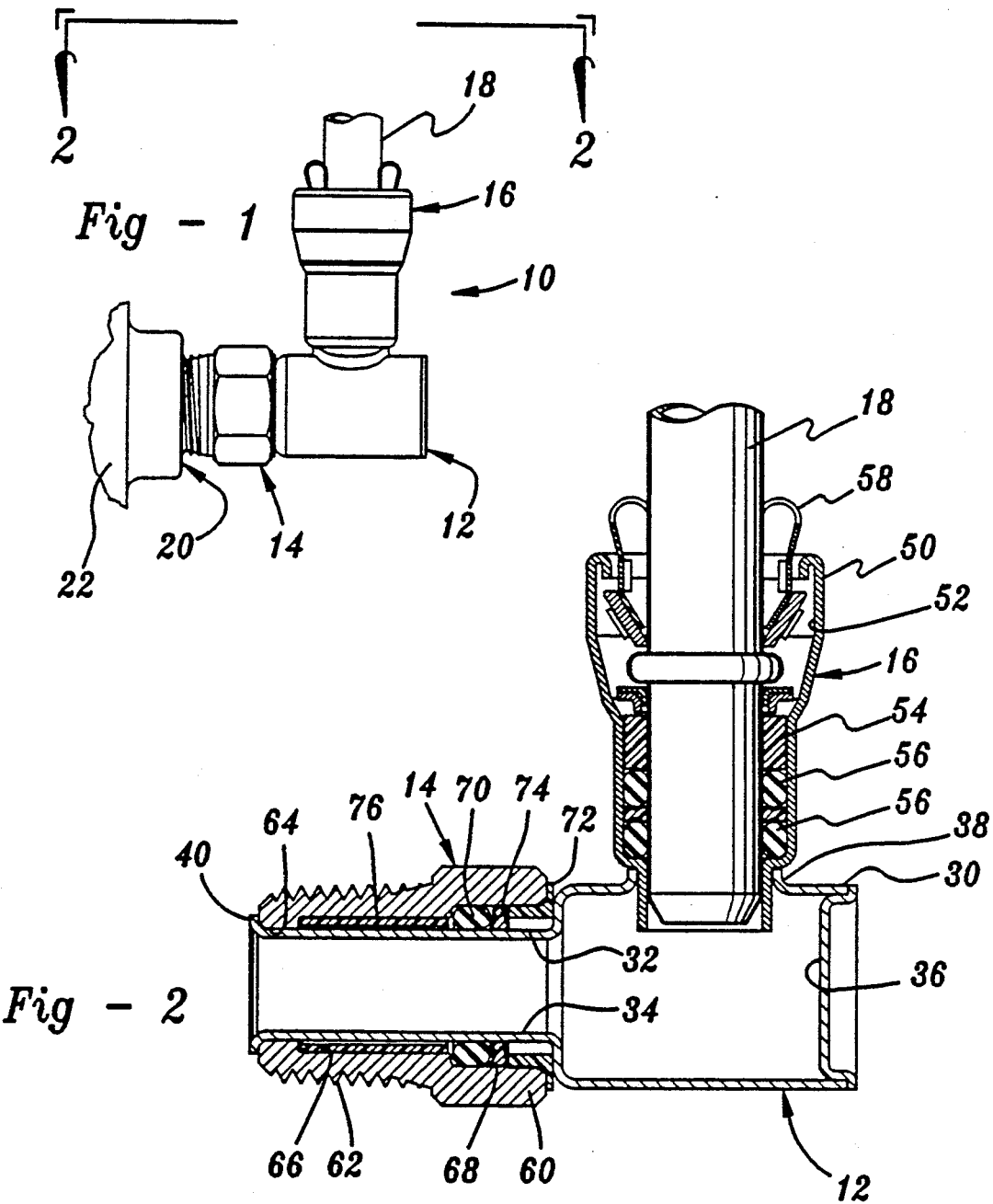

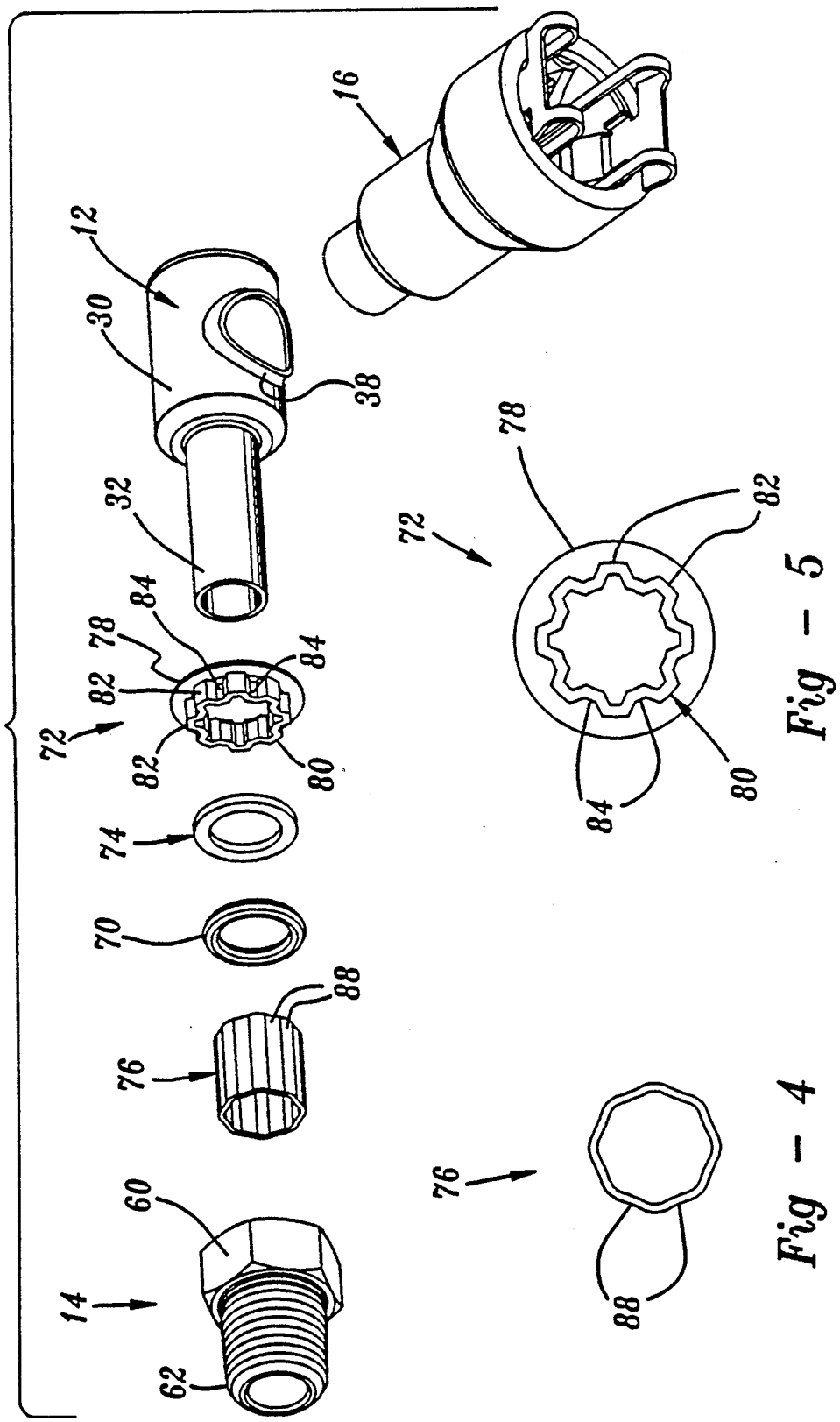

MEANS OF IMPROVING PERFORMANCE OF SWIVELLING PRESSURE SEALING DEVICES

BACKGROUND AND SUMMARY OF THE INVENTION

The present invention relates to fluid connectors and, more particularly, to swivelable fluid connectors.

Two very important areas of concern related to pressure confining swivellable joints are the range of temperature over which the joint will safely operate and the corrosion that is experienced by the materials of the two main non-elastomer joint elements. It has been shown that by limiting the change in deformation an elastomer seal is subjected to during operation, the elastomer operational temperature range may be increased, particularly in the low temperature operation. This is very important because formulations of elastomers to achieve lowered temperature operation results in a loss of important mechanical/ physical properties such as abrasion resistance and tensile strength. The materials used to soften the elastomer to provide better "spring back" from low temperature deformation are lost over a period of time shortening seal life. To overcome shortened life, a more expensive elastomer having similar mechanical properties must be used.

The benefits of lower cost, longer life, and better, mechanical properties are gained if a low cost means of limiting the deformation of an elastomer seal during normal performance can be found to replace current means of limiting deformation. The main barrier to achieve these benefits has been the cost of providing the very close fits of the two elements which must swivel with respect to each other.

In high quantity, low cost applications, it is currently the solution to pay more for an elastomer. It is not uncommon to pay 4 to 100 times the cost per pound of elastomer to achieve the desired temperature results.

The present invention shows a very low cost means for achieving the minimal change in elastomer deformation in this class of devices. The means disclosed herein also provides the possibility of a second very important benefit which may be achieved by permitting the use of dissimilar materials for the two elements which swivel relative to each other.

It is possible to separate two dissimilar materials, such as two different metals, in a manner which discourages corrosion even in the presence of an electrolyte or salt-like spray. This is especially appealing because metals are often used in connectors because of their strength under high temperatures. In actual practice this feature can result in very significant cost reductions and improve service life because one of the metal components can be made of an inexpensive material such as steel. In non-swivelling situations, the fixed relationship of two elements which are sealed by an elastomer, give rise to minimum deformation and allow operation at lower temperatures when similar materials are used, however, use of dissimilar materials leads to rapid corrosion.

In a swivelling joint, there are many situations where one element of the joint is attached to a port in a device, and the other element of the swivelling joint must connect to steel tubing for example. If the device with the port to be connected happened to be an aluminum fitting, the fitting would normally corrode quite quickly if it were intimate with a steel element of the joint which is connected to the steel tubing.

It has been found that one may improve both the sealing temperature and the dissimilar metal corrosion by using the means disclosed herein. As an example of the use of the means disclosed the embodiment of an aluminum casting with a port to be pressure confining or excluding connected to a steel tubing in a swivelling connection will be discussed in the figures that follow.

It is an object of the present invention to provide a means by which the operating temperature of an elastomer sealing material may be lowered. It is also an object of ht present invention to reduce corrosion between two dissimilar metal materials in swivelling-type pressure confining or excluding joints.

From the following detailed description taken in conjunction with the accompanying drawings and subjoined claims, other objects and advantages will become apparent to those skilled in the art.

BRIEF DESCRIPTION OF THE DRAWINGS

FIG. 1 illustrates an elevation view of a fitting assembly in accordance with the present invention.

FIG. 2 is a section view taken along line 2—2 of FIG. 1.

FIG. 3 is an exploded perspective view of the fitting of FIG. 1.

FIG. 4 is an end elevation view of a spacing element in accordance with the present invention.

FIG. is an end elevation view of a spacing element in accordance with the present invention.

Figure 6:
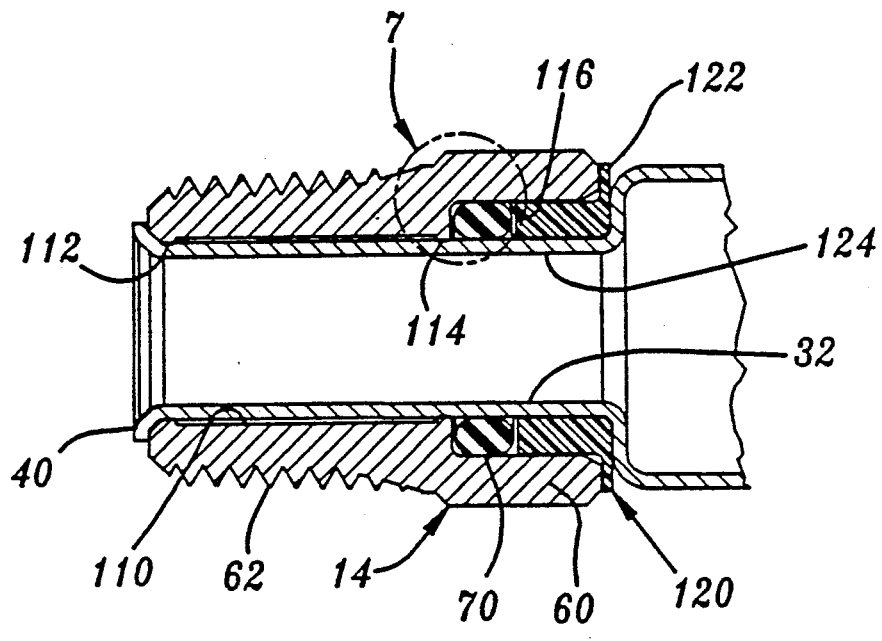

FIG. 6 is a section view of a second embodiment in accordance with the present invention.

Figures 7, 8:
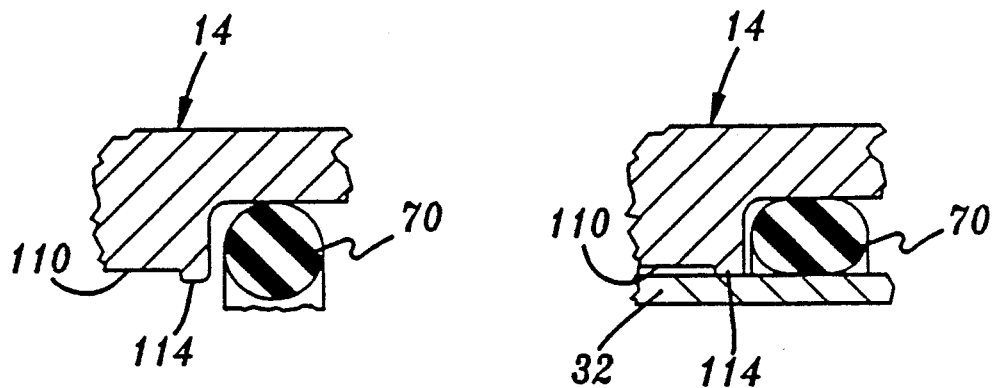

FIG. 7 is an enlarged view of FIG. 6 within circle 7.

FIG. 8 is an enlarged view like that of FIG. 7 of the sealing member without the housing stem.

DETAILED DESCRIPTION OF THE PREFERRED EMBODIMENT

Referring to the figures, particularly FIGS. 1-5, a swivellable fitting assembly is illustrated and designated with the reference numeral 10. The swivellable fitting assembly 10 generally includes a housing 12, a rotatable nipple 14, and a conduit receiving housing 16. The conduit receiving housing 16 receives a conduit 18. The nipple 14 is coupled with a port 20 of a device 22 as seen in FIG. 1.

Turning to FIG. 2, the housing 12 generally has an overall cylindrical shape with a hollow body portion 30 with an extending stem 32. The stem 32 has an axial bore 34 therethrough opening into the interior 36 of the hollow body portion 30. The body portion 30 includes an opening 38 for receiving and retaining the conduit receiving housing 16. Generally, the housing 12 is formed from a metallic material such as steel and is stamped into a desired cylindrical configuration. The stem 32 includes a radially outward extending flange 40 which retains the nipple 14 axially about the stem 32. The nipple 14 is positioned onto the stem 32 prior to the stamping of the stem end which forms the flange 40 on the stem 32.

The conduit receiving housing 16 generally includes a body 50 which is secured into the aperture 38 of body 30. The body 50 includes an axial bore 52 therethrough having bushing 54, sealing members 56, washer 57 and a conduit retainer 58. The particular conduit receiving housing 16 may vary depending upon the particular use of the fitting assembly.

The nipple 14 has an overall cylindrical shape with a hex nut portion 60 and a cylindrical exterior threaded portion 62. The nipple 14 is rotatably positioned about the stem 32 to provide rotation of nipple 14 and housing 30 with respect to one another. The nipple 14 has an axial bore 64 having a diameter slightly larger than the outer diameter of stem 32 to enable the nipple 14 to be rotatably positioned over the stem 32. The bore 64 has increased diameter portions 66 and 68 to enable accommodation of sealing member 70 and spacer members 72, 74 and 76. The nipple 14 is generally manufactured from an aluminum material or the like providing a different type of material than the housing 12.

Turn to FIGS. 3-5 for a better understanding of the sealing member 70 and spacers 72-76. The sealing member 70 is generally an elastomeric O-ring as illustrated in FIG. 6. Spacer 74 is an annular ring generally formed from a polymeric material, however, it could be formed of a metallic material. Likewise, spacers 72 and 76 may also be formed from metallic or polymeric materials.

Spacer 72 includes an annular flange 78 and a cylindrical corrugated sleeve portion 80. The corrugation portion 80 includes a plurality of raised plateaus 82 separated by a plurality of valleys 84. These plateaus 82 and valleys 84 have interior and exterior surfaces. The flat exterior surfaces of the plateaus 82 enable the spacer 72 to conform to the interior portion of the hex nut 60 to provide equal spacing within the hex nut portion 60. The spacer 72 abuts the inside of the hex portion 60 and positions and maintains the ring spacer 74 within the nipple 14. Also, the spacer 72 positions the sealing member 70 within the increased diameter bore 68. Spacers 72 and 74 prohibit off axis wobbling of the nipple 14 to maintain the sealing member 70 in a desired compressed state limiting compression of the sealing member, to provide optimum sealing between the stem 32 and the nipple 14.

Spacer 76 has an overall cylindrical shape preferably of a polygonal design having a plurality of sides 88. The spacer 76 is positioned within increased diameter bore 66 surrounding the stem 32. The spacer 76, like spacers 74 and 72, prohibit off axis wobbling of the nipple 14 to maintain the optimum sealing of sealing member 70. The interior closed diameter portion of the spacer 76 is such that it is slightly larger than the diameter of the stem 32.

The flange 78 of spacer 72 provides a bearing surface between the nipple 14 and the housing 30. The flange 78 is positioned such that during rotation of the nipple 14 or housing 12 that the movement has no adverse effect on the sealing of the seal member 70. Also, the flange 78 prohibits contact of the nipple 14 and housing 12 to reduce corrosion between the two.

Turning to FIGS. 6-8, an alternate embodiment of the present invention is illustrated. Like elements will be designated with the same references numerals. The housing 12 is illustrated with stem 32 extending into nipple 14. Nipple 14 has a hex nut portion 60 and a cylindrical threaded exterior portion 62.

The nipple 14 includes an axial bore 100 through the nipple 14. The axial bore 110 includes a pair of inwardly extending radial flanges 112 and 114 positioned within the axial bore 110. Also the axial bore 110 includes and increased diameter portion 116 positioned adjacent the nut portion 60. The flange 114 separates the increased diameter portion 116 from the axial bore 110 and the flange 112 is positioned adjacent the stem flange 40.

The inward flanges 112 and 114 provide a spacing function for the nipple 14 with respect to the stem 32 as illustrated in FIG. 8. The sealing member 70 is substantially the same as that previously described. A bushing 120 having a flange 122 and a cylindrical portion 124 is positioned adjacent the sealing member to maintain the sealing member 70 within the nipple 14. The body 124 of the bushing 20 generally has an exterior surface adapted to contact the increased diameter portion of the fitting 14 and an interior surface 128 adapted to contact the stem 32 as illustrated in FIG. 6. The bushing 120 may include a right cylindrical body or a polygonal body to fit into the increased diameter bore 116 of the central bore 110. The bushing 120 acts like above described spacer 72.

Referring to FIGS. 6-8, a very simple method of providing a swivelling nut that does not wobble on the stem of the swivelling body of the elbow is shown. The flanges 112 and 114 in the inside diameter of nut 14 are deformed as nut 14 is assembled over the stem portion 32 of swivel elbow housing 12. As in the previous figures, seal 70 seals between nut 14 and stem 32 and the rear closing and seal retaining bushing 120 assembles into bore 116 of nut 14. During assembly of nut 14 to stem portion 32, small flanges 112 and 114 are deformed to a point that allows accommodation of the manufacturing tolerances of nut 14 and stem portion 32. Also, depending on the relative strength of the material and geometry of nut 14 and stem portion 32 the flanges 112 and 114 may also deform stem portion 32.

While the above detailed description provides a preferred embodiment of the present invention, it will be understood that the present invention is susceptible to modification, variation and alteration without deviating from the scope and fair meaning of the subjoined claims.

What is claimed is:

1. A swivellable fitting assembly comprising:
    a housing including an extending stem, and means for receiving a conduit, said stem including an axial bore such that fluid may pass through said housing;
    a rotatable nipple having an axial bore therethrough, means for securing said nipple with said stem, said axial bore having at least one increased diameter portion and an end portion of the axial bore closely surrounding said stem;
    sealing means for sealing said stem portion with said rotatable nipple, said sealing means positioned about said stem and in sealing contact with said rotatable nipple in said at least one said increased diameter portion of said axial bore; and
    spacer means for spacing said rotatable nipple with said stem portion, said spacer means including a cylindrical spacer extending from said end portion of said axial bore to said sealing means, said cylindrical spacer positioned in a first enlarged diameter portion of said axial bore, a second spacer extending from said sealing means and extending out the other end of said nipple and positioned in a second enlarged diameter portion of said axial bore such that said sealing means is limited in compression to provide sealing between said rotatable nipple and said stem portion of said housing.

2. The fitting assembly according to claim 1 wherein said sealing means further comprising an O-ring seal.

3. The fitting assembly according to claim 1 wherein a third spacer, which is an annular ring, is positioned between said sealing means and said second spacer.

4. The fitting assembly according to claim 1 wherein said cylindrical member is corrugated having a plurality of plateaus and valleys and a radially extending flange on one end.

5. The fitting assembly according to claim 4 wherein said cylindrical member flange is positioned between said nipple and said housing provides a bearing surface between said nipple and housing.

6. The fitting assembly according to claim 1 wherein said cylindrical member has a polygonal shape in cross section.

* * * * *